United States Patent
Read et al.

(10) Patent No.: US 12,017,379 B2
(45) Date of Patent: Jun. 25, 2024

(54) RIBBONIZED TOWS FOR OPTIMIZED IMPROVED COMPOSITE PERFORMANCE

(71) Applicant: Raytheon Technologies Corporation, Farmington, CT (US)

(72) Inventors: Kathryn S. Read, Marlborough, CT (US); Andrew J. Lazur, Laguna Beach, CA (US)

(73) Assignee: RTX CORPORATION, Farmington, CT (US)

( * ) Notice: Subject to any disclaimer, the term of this patent is extended or adjusted under 35 U.S.C. 154(b) by 45 days.

(21) Appl. No.: 17/645,190

(22) Filed: Dec. 20, 2021

(65) Prior Publication Data

US 2023/0191656 A1    Jun. 22, 2023

(51) Int. Cl.
| | |
|---|---|
| *B28B 3/00* | (2006.01) |
| *B28B 1/42* | (2006.01) |
| *B28B 1/52* | (2006.01) |
| *B28B 3/12* | (2006.01) |
| *B28B 23/04* | (2006.01) |

(52) U.S. Cl.
CPC ............... *B28B 3/126* (2013.01); *B28B 1/42* (2013.01); *B28B 1/522* (2013.01); *B28B 23/04* (2013.01)

(58) Field of Classification Search
CPC .................................. B28B 3/126; B28B 1/42
See application file for complete search history.

(56) References Cited

U.S. PATENT DOCUMENTS

| | | | |
|---|---|---|---|
| 5,049,329 A | 9/1991 | Allaire et al. | |
| 5,250,243 A | 10/1993 | Allaire et al. | |
| 5,459,114 A | 10/1995 | Kaya et al. | |
| 5,547,622 A | 8/1996 | Chalasani et al. | |
| 5,732,748 A | 3/1998 | Aucagne et al. | |
| 5,756,206 A * | 5/1998 | Davies ................... | D07B 7/145 |
| | | | 428/394 |
| 6,585,842 B1 | 7/2003 | Bompard et al. | |
| 6,641,893 B1 | 11/2003 | Suresh et al. | |
| 7,837,914 B2 | 11/2010 | Kostar et al. | |
| 8,440,045 B2 | 5/2013 | Bremmer et al. | |
| 8,545,938 B2 | 10/2013 | Schmidt et al. | |
| 9,908,305 B2 | 3/2018 | Chamberlain et al. | |
| 10,822,281 B2 | 11/2020 | She et al. | |
| 10,829,418 B2 | 11/2020 | Jackson et al. | |
| 10,954,169 B2 | 3/2021 | Droz et al. | |
| 11,015,467 B2 | 5/2021 | Read | |
| 11,072,565 B2 | 7/2021 | Weaver et al. | |

(Continued)

FOREIGN PATENT DOCUMENTS

| | | |
|---|---|---|
| CN | 111058187 A | 4/2020 |
| DE | 102015209535 A1 | 11/2016 |

(Continued)

OTHER PUBLICATIONS https://www.sciencedirect.com/science/article/pii/S0263822315000914#f0005 (Year: 2015).*

(Continued)

*Primary Examiner* — Nicholas R Krasnow
(74) *Attorney, Agent, or Firm* — Kinney & Lange, P. A.

(57) ABSTRACT

A method of preparing a ceramic fabric for use in a ceramic matrix composite includes transforming a ceramic tow from a first tow geometry to a second tow geometry, thereby reducing a first dimension of the ceramic tow and increasing a second dimension of the ceramic tow orthogonal to the first dimension to produce a flattened tow. The method includes weaving or braiding the flattened ceramic tow to form a ceramic fabric.

10 Claims, 5 Drawing Sheets

(56) References Cited

U.S. PATENT DOCUMENTS

| | | |
|---|---|---|
| 2002/0022422 A1 | 2/2002 | Waldrop et al. |
| 2002/0084558 A1 | 7/2002 | Hanzawa et al. |
| 2005/0164578 A1 | 7/2005 | Aldridge et al. |
| 2007/0096371 A1 | 5/2007 | McGuigan et al. |
| 2007/0099527 A1 | 5/2007 | Brun et al. |
| 2010/0119777 A1 | 5/2010 | Merrill et al. |
| 2012/0237707 A1 | 9/2012 | Beraud et al. |
| 2012/0301691 A1 | 11/2012 | Charleux et al. |
| 2014/0099484 A1 | 4/2014 | Roberts et al. |
| 2016/0186691 A1 | 6/2016 | Charleux et al. |
| 2017/0015595 A1 | 1/2017 | Weaver et al. |
| 2017/0348876 A1 | 12/2017 | Lin et al. |
| 2019/0048730 A1 | 2/2019 | Subramanian et al. |
| 2019/0359531 A1 | 11/2019 | Steffier et al. |
| 2019/0389171 A1 | 12/2019 | Nelson |
| 2020/0078822 A1 | 3/2020 | Khattab et al. |
| 2020/0385898 A1 | 12/2020 | Chiu et al. |
| 2021/0239008 A1 | 8/2021 | Read |
| 2021/0262353 A1 | 8/2021 | McCaffrey et al. |
| 2023/0191656 A1 | 6/2023 | Read |

FOREIGN PATENT DOCUMENTS

| | | |
|---|---|---|
| EP | 0302449 A2 | 2/1989 |
| EP | 0589286 A1 | 3/1994 |
| EP | 1215183 A1 | 6/2002 |
| EP | 4119709 A1 | 1/2023 |
| GB | 2252315 A | 8/1992 |
| JP | 2000096387 A | 4/2000 |
| JP | 2005290204 A | 10/2005 |
| JP | 2007332484 A | 12/2007 |
| WO | 9412708 A1 | 6/1994 |
| WO | 2010061139 A2 | 6/2010 |
| WO | 2021005282 A2 | 1/2021 |

OTHER PUBLICATIONS http://www.mschangart.com/studio-art-honors/ceramic-bowl (Year: 2014).*
Extended European Search Report for EP Application No. 22212549.4, dated Jun. 7, 2023, pp. 13.
Partial European Search Report for EP Application No. 22212614.6, dated Jun. 30, 2023, pp. 14.
Extended European Search Report for EP Application No. 22212614.6, dated Oct. 2, 2023, pp. 13.
Extended European Search Report for EP Application No. 22205639.2, dated Mar. 24, 2023, 7 pages.
Extended European Search Report for EP Application No. 22212559.3, dated May 10, 2023, pp. 8.

* cited by examiner

Fig. 5

RIBBONIZED TOWS FOR OPTIMIZED IMPROVED COMPOSITE PERFORMANCE

BACKGROUND

The present invention relates to ceramic matrix composites, and more particularly to the preparation of woven ceramic fabrics for use in ceramic matrix composites.

The microstructure of a composite component is dictated, in part, by the fiber tow structure. In the case of ceramic matrix composites, the microstructure of the tows also dictates the way the matrix is deposited during chemical vapor infiltration (CVI), polymer infiltration and pyrolysis (PIP), and melt infiltration (MI). The microstructure has a default bimodal pore distribution with intra- and inter-tow porosity (or pore size), with inter-tow porosity typically exceeding intra-tow porosity. Homogenizing the disparity between intra- and inter-tow porosity helps to avoid or reduce stress concentrations in the resulting composite component.

SUMMARY

A method in accordance with an exemplary embodiment of this disclosure includes transforming a ceramic tow from a first tow geometry to a second tow geometry. The transformed tow geometry reduces a first dimension of the ceramic tow and increases a second dimension of the ceramic tow orthogonal to the first dimension relative to the first tow geometry and produces a flattened ceramic tow. Ceramic fabrics can be constructed by weaving or braiding the flattened ceramic tow.

A further method in accordance with another exemplary embodiment of this disclosure includes reducing the first dimension of the ceramic tow by at least 15% and increasing the second dimension by at least 15% relative to the first or as-received tow geometry.

A further method in accordance with another exemplary embodiment of this disclosure includes separating the ceramic fabric into a plurality of plies in which the average inter-tow pore size of each ply is 35% or less of an average center-to-center spacing of the flattened ceramic tows.

A further method in accordance with another exemplary embodiment of this disclosure includes separating the flattened ceramic tow prior to forming the ceramic fabric to form a plurality of flattened ceramic subtows.

DETAILED DESCRIPTION

As described herein, a method for preparing a ceramic fabric for a ceramic matrix composite (CMC) component includes transforming a ceramic tow from a first tow geometry to a second tow geometry that reduces a first dimension of the ceramic tow and increases a second dimension of the ceramic tow orthogonal to the first dimension. The transformed tow forms a flattened or ribbonized ceramic tow for constructing a woven or braided ceramic fabric. Compared to a traditional ceramic fabric constructed with as-received ceramic tow, the flattened or ribbonized ceramic fabric has reduced average inter-tow pore size and increased average intra-tow pore size that homogenizes pore distribution and reduces the macro roughness on the surface of CMC components. Homogeneous CMC microstructures, such as those achieved by tuning inter-tow and intra-tow pore size with transformed ceramic tows, achieve improved interlaminar tensile strength, interlaminar shear strength, and thermal conductivity.

Figure 1:
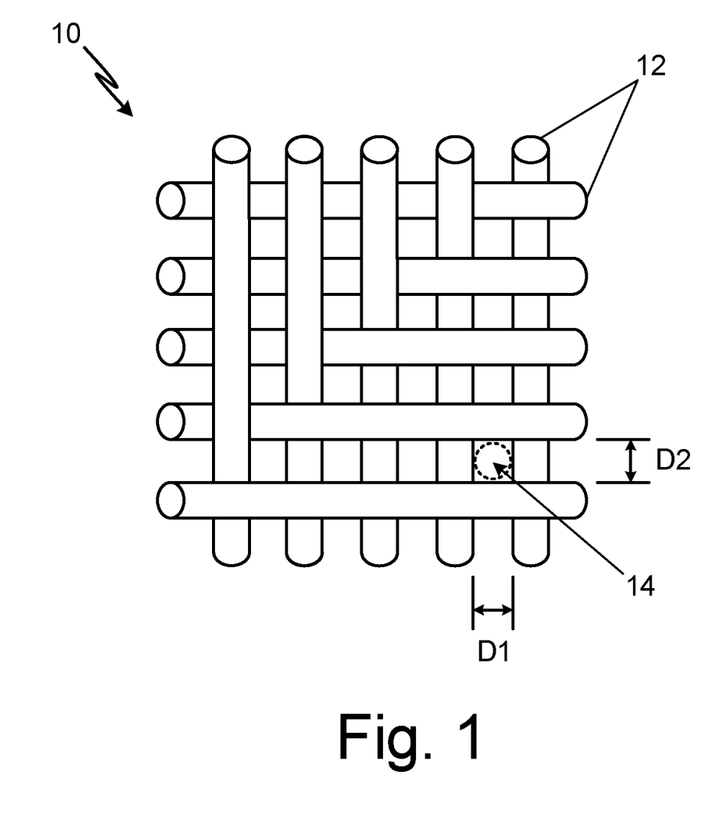
FIG. 1 is a simplified illustration of a ceramic fabric constructed using as-received ceramic tows.

FIG. 1 is a simplified version of woven fabric sheet 10 constructed with standard, as-received ceramic tows 12. Sheet 10 is formed from warp and weft (i.e., perpendicular) tows 12 which can be arranged in various woven architectures such as plain, harness (e.g., 3, 5, 8, etc.), twill, braid, or non-symmetric to name a few non-limiting examples. Each tow 12, as manufactured, can be a bundle of silicon carbide filaments or another suitable ceramic filament. Sheet 10 can exhibit inter-tow spacing defined by the distances D1 between adjacent warp tows and D2 between adjacent weft tows. The particular spacing between two adjacent warp or weft tows 12 can be generally uniform along the length of the respective tows 12, or can vary along the length of the respective tows 12. Variances typically arise from manufacturing imperfections. A combination of generally uniform and varied inter-tow spacing within sheet 10 is also possible.

Sheet 10 further includes pores 14 at least partially defined by the distance D1 between adjacent warp tows 12 and the distance D2 between adjacent weft tows 12. Distances D1 or D2 could also represent a diameter in rounded pores 14 (represented in FIG. 1 by a dashed circular line). Pores 14 can be three dimensional with additional dimensions generally orthogonal to D1 and/or D2 (not shown). Depending on the particular woven architecture of sheet 10, D1 can be generally equal to D2 as shown, but D1 can also be greater than D2, and vice versa. In the embodiment shown, the average size of D1 and/or D2 can be between 400 to 1500 microns. In an exemplary embodiment, D1 and/or D2 can be about 400 microns. It should be understood that sheet 10 can include a distribution of pore 14 dimensions (e.g., ranging from 400 to 1500 microns) and shapes (e.g., both rounded and straight-edged), because of fabric deformation and lack of straightness of tows 12.

Figure 2A:
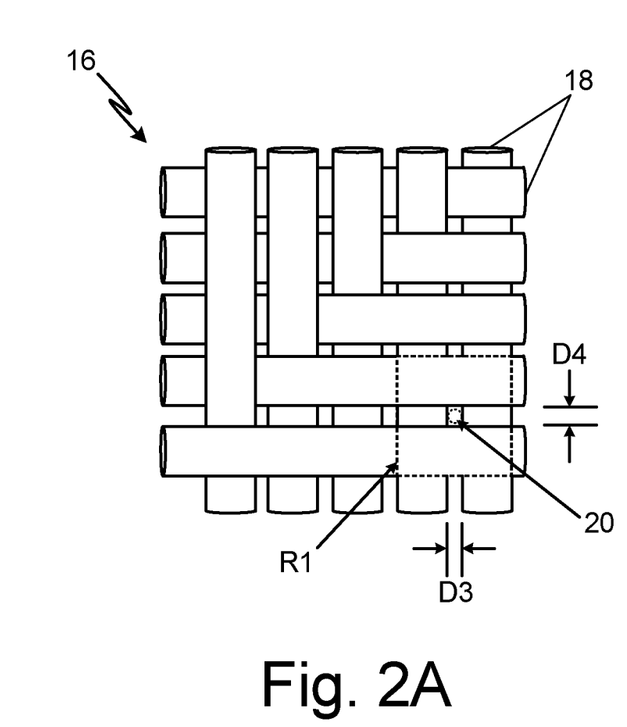
FIG. 2A and FIG. 2B are simplified illustrations of a ceramic fabric constructed using transformed ceramic tows.
Figure 2B:
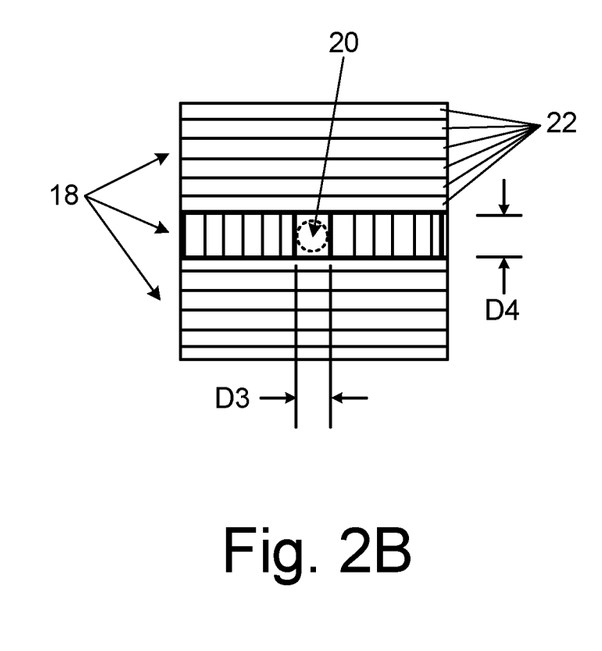

It can be desirable to reduce inter-tow spacing and the size of pores 14 while modifying pore distribution within sheet 10. FIG. 2A is a simplified illustration of woven fabric sheet 16. FIG. 2B is an enlarged view of region R1 of sheet 16. Sheet 16 represents sheet 10 after transformation of warp and weft tows 12 into flattened or ribbonized tows 18 and, optionally, into subtows 22. As used herein a "subtow" refers to a grouping or a subset of filaments from a parent tow 12 or a transformed parent tow 18 as a result of processing parent sheet 16 or parent tow 18, discussed in greater detail below. If constructed from subtows 22, sheet 16 can be referred to as a separated sheet. It can also be appropriate to refer to a separated sheet as a split or divided sheet.

Sheet 16 includes pores 20 at least partially defined by the distance D3 between adjacent warp tows 18 and the distance D4 between adjacent weft tows 18. Similar to sheet 10, distances D3 and D4 of pores 20 can represent a diameter of rounded pores 20 (represented in FIGS. 2A and 2B as a dashed circular line). Pores 20 are defined by equal, or unequal, distances D3 and D4 depending on the woven architecture of sheet 16. An average size of D3 and/or D4 can be between 50 microns and 1500 microns. In a particular embodiment, the average inter-tow pore size, as expressed by D3 and D4, can be between 50 microns and 575 microns. In other embodiments, the average inter-tow pore size can be between 50 microns and 425 microns. In yet another embodiment, the average inter-tow pore size can be between 50 microns and 300 microns. In each embodiment, the picks-per-inch (or ends-per-inch) of sheet 16 is between 10 and 16.

Figure 3A:
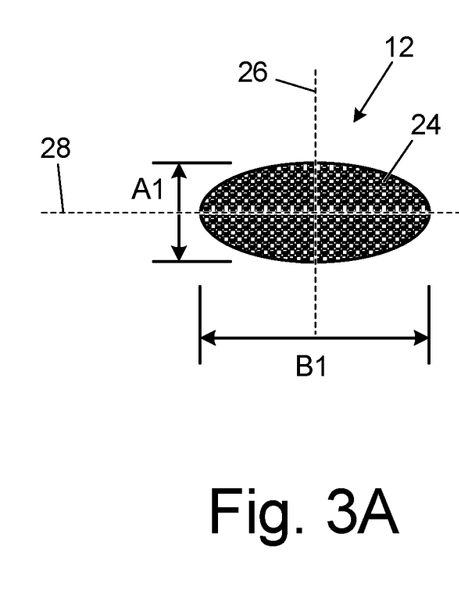
FIG. 3A and FIG. 3B are a simplified illustrations of an as-received ceramic tow and a transformed ceramic tow, respectively.
Figure 3B:
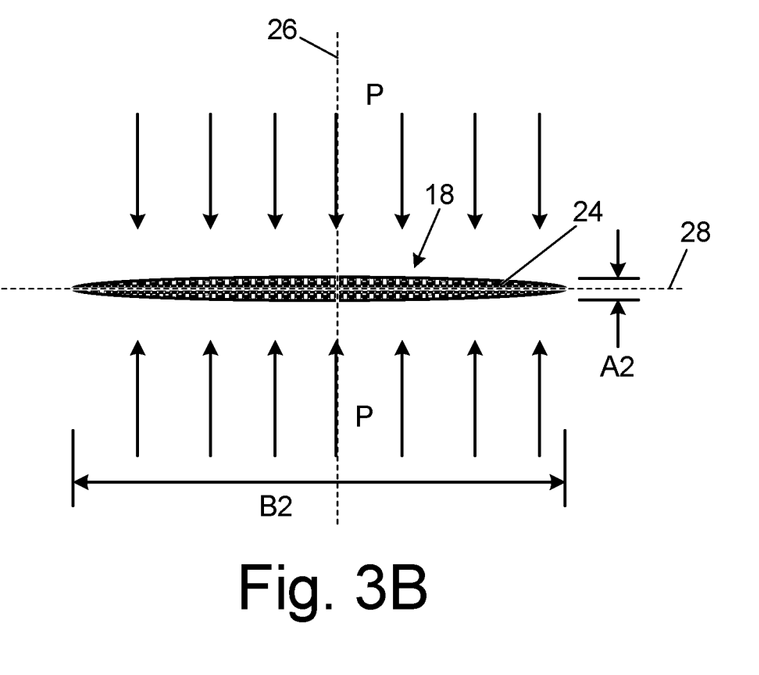

FIG. 3A and FIG. 3B represent schematic cross-sectional views of as-received tow 12 and transformed tow 18, respectively. Tows 12 and 18 are each formed by multiple, parallel filaments 24. In an exemplary embodiment, each tow 12, 18 includes roughly 500 filaments, but in alternative embodiments, tow 12, 18 can include more filaments (e.g., 500 to 2,000 filaments) or fewer filaments (e.g., 125 to 500 filaments). Tows 12 and 18 can be described by dimensions measured within respective cross-sectional planes normal to a filament extension direction and represented by FIG. 3A and FIG. 3B. In each figure, axis 26 and axis 28 are orthogonal and extend through tow 12 and tow 18. As shown, dimensions A1 and B1 of tow 12 are measured parallel to axis 26 and axis 28, respectively. Similarly, dimensions A2 and B2 of tow 18 are measured parallel to axis 26 and axis 28, respectively. Dimensions A1 and B1 of tow 12 can be equal to form a tow with a circular cross-section. In other instances, dimension A1 may be larger than dimension B1 to form an elliptical or rectangular cross-section whose major axis coincides with axis 26. Alternatively, dimension A1 can be smaller than B1 to form an elliptical or rectangular cross-section having a major axis coinciding with axis 28 as shown in FIG. 3A and FIG. 3B.

In each embodiment, applying compressive pressure in opposing direction to opposite sides of tow 12 transforms tow 12 into flattened or ribbonized tow 18. As represented by pressure P shown in FIG. 3B, compression of tow 12 is applied in opposite directions parallel to axis 26. Various methods for compressing tows 12 are available. For instance tows 12 can be compressed by passing tows 12 through rollers or dies. In other embodiments, fluid pressure, air jets, air pressure, or vacuum pressure can be applied to tow 12. Compression of tows 12 into tows 18 reduces a dimension of tow 12 measured along a direction of applied pressure P while increasing a dimension of tow 12 orthogonal to the direction of applied pressure P. As shown, pressure P compresses tow 12 along axis 26, reducing dimension A1 to A2 and increasing dimension B1 to B2. As a result, tow 18 has been flattened along axis 26 relative to tow 12, spreading filaments 24 along axis 28 in a process that is sometimes referred to as ribbonizing.

Figure 4A:
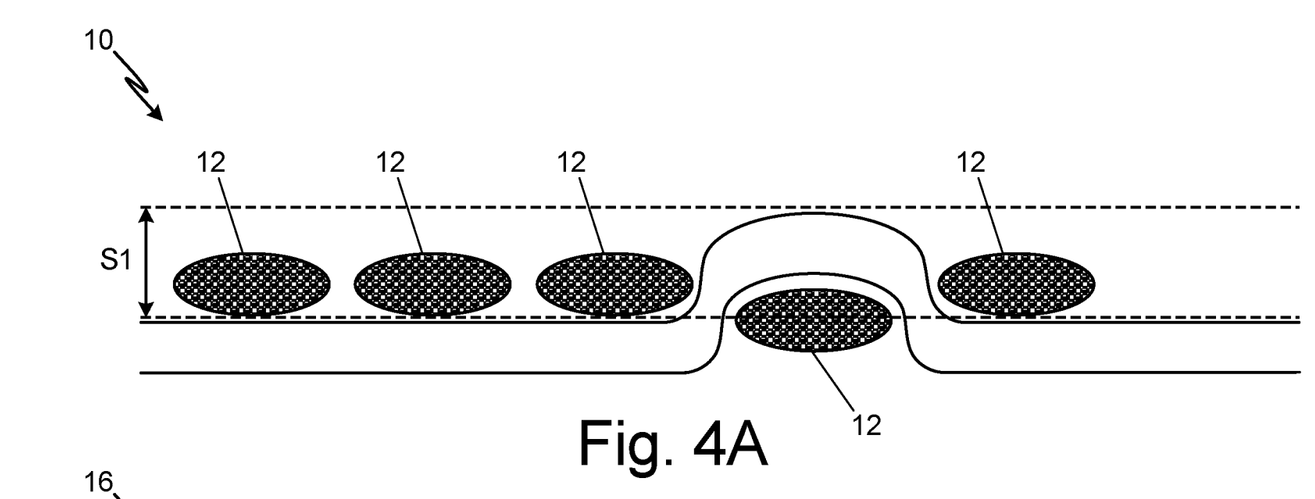
FIG. 4A and FIG. 4B are schematic illustrations of surface roughness for ceramic fabric constructed using as-received ceramic tows and constructed using transformed ceramic tows, respectively.
Figure 4B:
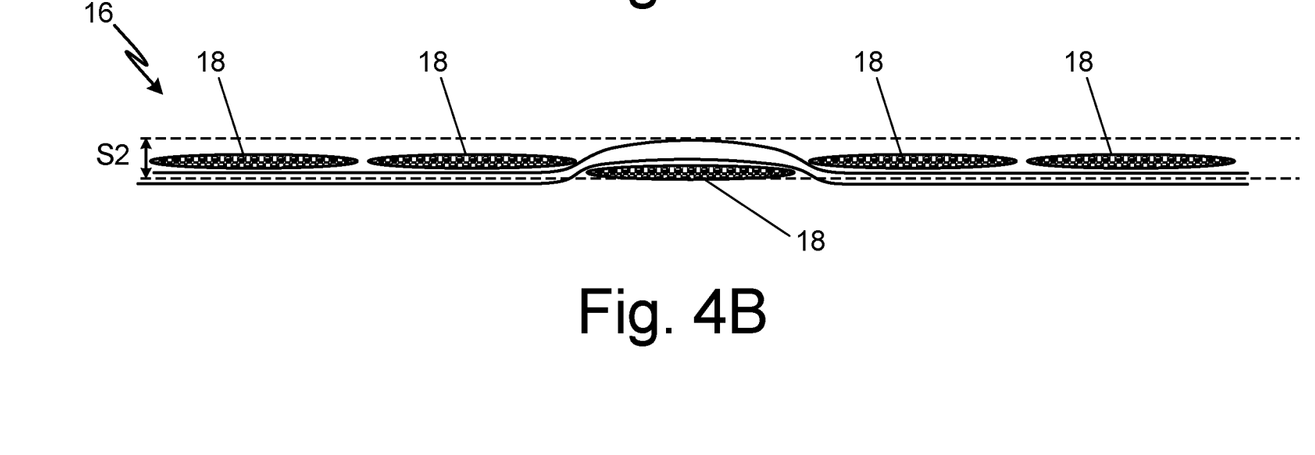

Fabrics formed from flattened or ribbonized tows 18 also benefit from reduced surface roughness and enable increased contact area between adjacent plies. FIG. 4A illustrates the surface amplitude S1 of ceramic fabric 10 constructed from as-received tows 12. FIG. 4B illustrates the surface amplitude S2 of ceramic fabric 16 constructed from transformed or flattened tows 18. As shown in FIGS. 4A and 4B, the reduced dimension A2 of tow 18 relative to dimension A1 of tow 12 contributes to reducing surface amplitude S2 of fabric 16 relative to surface amplitude S1 of fabric 10. The increased contact area between adjacent plies in a composite layup can lead to improved interlaminar properties in the CMC component.

Figure 5:
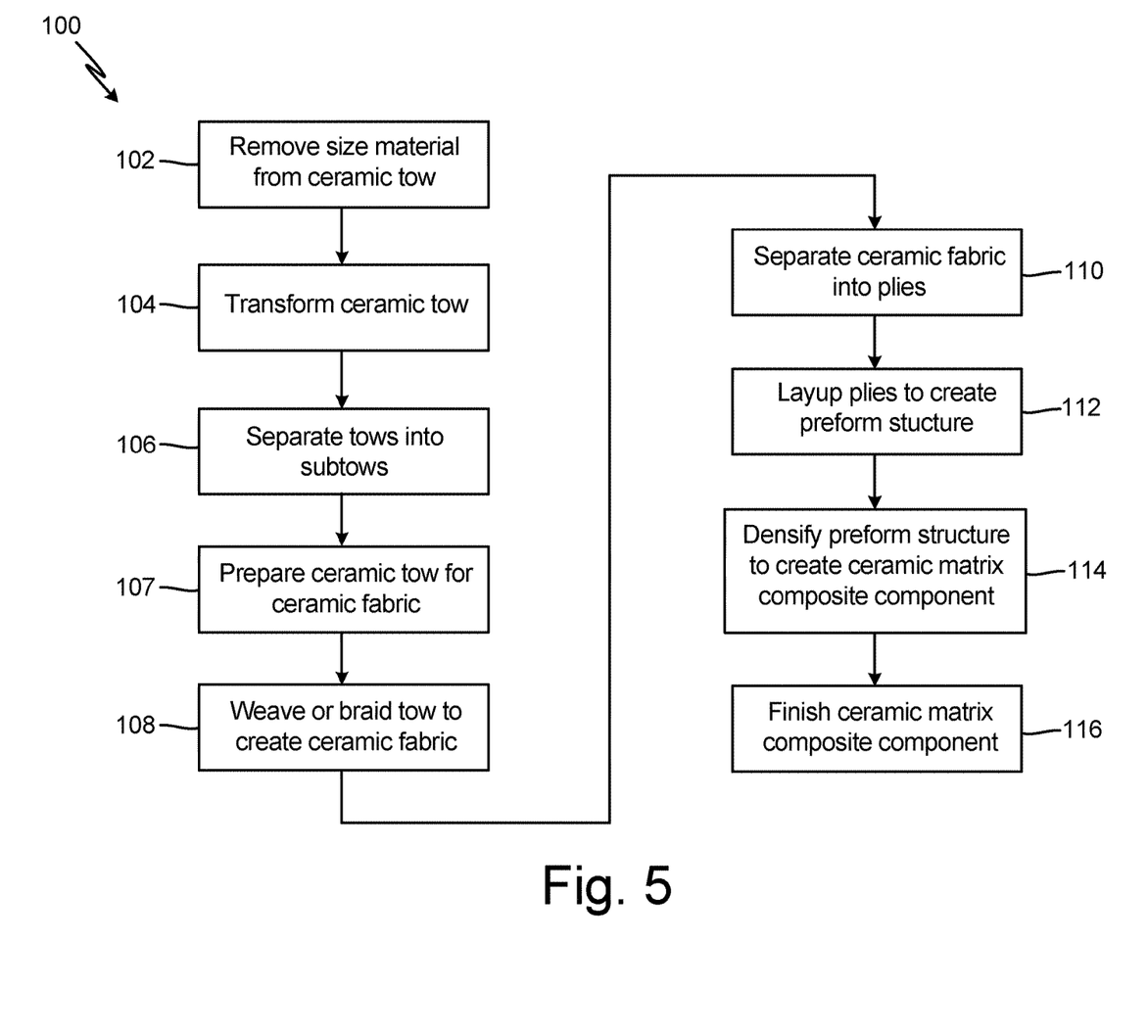
FIG. 5 is a flow chart describing a method of preparing ceramic tow for use in a ceramic matrix composite.

FIG. 5 is a flow chart describing method 100 for transforming a ceramic tow for use in a ceramic fabric. Method 100 includes steps 102, 104, 106, 108, 110, 112, 114, and 116. The sequence depicted by FIG. 5 is for illustrative purposes only and is not meant to limit method 100 in any way as it is understood that portions of the method can proceed in a different logical order, additional or intervening portions can be included, or described portions of the method can be divided into multiple portions, or described portions of the method can be omitted without detracting from the described below.

Method 100 can be used to manufacture components of a gas turbine engine. Fabrics constructed using transformed tows are especially useful for exterior surfaces of gas turbine engine components interfacing with an airstream, in particular, an airfoil, a blade outer air seal, and/or a strut. As discussed above, fabrics constructed with flattened tows improve surface roughness of components. The reduced macro surface roughness CMC components of a gas turbine engine reduce disruptions to the airstream flowing over its exterior surfaces.

Preparing tow 12 for transformation begins by removing size material from tow 12 in step 102. While sizing material deposited on the exterior of tow 12 protects tow 12 while weaving or braiding tow 12 into ceramic fabric, it also helps tow 12 retain its shape. Removing the size material allows filaments 24 of tow 12 to spread more easily and thereby allows formation of tow 18 to occur more readily. Desizing processes are tailored to particular sizing materials and tow materials. For example, desizing can be achieved by heating tow 12, exposing tow 12 to a flame, or other oxidizing atmosphere, to burn off size material. Other processes include washing tow 12 in a heated fluid bath, such as ammonia or water, to break down or dissolve the sizing material.

After tow 12 is desized, compression of tow 12 transforms tow 12 into tow 18 in step 104, flatting or reducing a dimension of tow 18 along a direction of compression and widening tow 18 along a direction orthogonal to the direction of compression. As discussed above, methods of applying compression include attaching tow 12 in tension across two or more rollers, which may be arranged along axis 26 of tow 12. Drawing tow 12 through the rollers applies pressure to tow 12 in opposing directions along axis 26. Similarly, tow 12 may be fed through a die. An aperture at an inlet end of the die approximates the as-received shape of tow 12 (e.g., as shown in FIG. 2A). At an outlet end of the die, the aperture shape transitions to a flattened form such that drawing tow 12 through the die applies compression to opposite sides of tow 12 along axis 26 while allowing tow 12 to expand in a direction orthogonal to the compressive pressure along axis 28. In other compressive processes, opposing jets of air or fluid impinge upon tow 12 to apply the compressive pressure. In leu of gas or fluid pressure, vacuum pressure can be used to draw tow 12 against a surface to produced transformed tow 18.

The transformation process of step 104 produces tows 18 with reduced dimension along the direction of compressive pressure in proportion the applied pressure while increasing in dimension along a direction orthogonal to, and in proportion with, the applied compressive pressure. Along the direction of applied compressive pressure, the dimension of tow 18 can be at little as 35% of the as-received dimension of tow 12. Orthogonal to the applied compressive pressure, the dimension of tow 18 can be up to 225% of tow 12. The dimension reductions and corresponding orthogonal dimension increases of tow 18 relative to tow 12 are proportional to the applied compressive pressure.

For example, where tow 18 is 85% (i.e., a 15% decrease) of tow 12 along the applied compressive pressure direction, tow 18 is at least 115% (i.e., a 15% increase) and up to 120% of tow 12 in the direction orthogonal to applied compressive pressure. In another example where tow 18 is at least 70% of tow 12 in a direction of applied compressive pressure, tow 18 is at least 130% (i.e., a 30% increase) and up to 145% of tow 12 in a direction orthogonal to the applied pressure. For a given as-received tow geometry the foregoing results are achieved by applying different pressure magnitudes to tow 12. Between these points, the reduction of tow 18 along the direction of applied compression and the increase of tow 18 in a direction orthogonal to the applied compressive direction vary in proportion to the applied compressive pressure. Additionally, for a given fabric architecture (e.g., 16 threads-per-inch or ends-per-inch), varying the degree tow 18 is flattened by compression varies the average inter-tow pore size, thinner and wider tows 18 reducing average inter-tow pore size by a greater degree than relatively taller and thinner tows 18.

Optionally, transformed tows 18 can be split into multiple subtows 22 in step 106 prior to weaving or braiding ceramic fabric 16. Methods for subtow creation include attaching tow 18 in tension across rollers equipped with spikes, ribs, or other protrusion or protrusions. As tow 18 passes over the roller, the protrusions impale tow 18 and thereby separate tow 18 into two or more subtows 22. Other methods for creating subtows 22 include drawing tow 18 through an air knife whereby an air jet impinges upon and separates tow 18 into two or more subtows 22. In some splitting operations, subtows 22 include 15% to 20% of the filaments from the parent tow. In other splitting operations, subtows 22 include 25% to 50% of the filaments from the parent tow. Splitting or separating tows 18 into subtows 22 may be used to further reduce or tailor the average inter-tow and/or intra-tow pore size of ceramic fabric 16.

Additionally, in some embodiments of method 100, tows 18 can be prepared in step 107 prior to weaving or braiding ceramic fabric 16. Preparing can refer to the wetting of tow 18 with water or ethanol. Tows preparation can include applying a thin layer of size material that protects filaments of tow 18 and reduces filament breakage during subsequent weaving, braiding, and other processing steps. Sizing materials include polyvinyl alcohol (PVA) or poly-vinyl butyral (PVB), which can be applied by spraying tows 18 or bathing tows 18 with the size material.

At step 108, ceramic fabric 16 can be formed, for example, by weaving transformed tows 18, or subtows 22 into a sheet (e.g., sheet 26). Alternatively, tows 18 can be braided onto a mandrel to form a sleeve or other braided structure. In yet another alternative embodiment, tows 18 may be arranged as a continuous roll of ceramic fabric. In some embodiments, a dry woven ceramic material can subsequently be impregnated with a polymer material to form a pre-preg sheet. Each of these fabrics can have characteristics identical or substantially similar to those discussed above (i.e., inter-tow pore size, tow thickness, tow width, etc.) with respect to sheet 16.

Weave patterns include harness satin, twill, and plain weaves while potential braid patterns include triaxial and biaxial braids. During the weaving or braiding process, tows 18 and/or subtows 22 remain untwisted. Weave patterns may have from 10 picks per inch (or ends per inch) to 16 picks per inch (or ends per inch), and braid patterns may have from 5 plaits per inch to 12 plaits per inch. The degree to which tow 18 is flattened or transformed relative to tow 12 is selected to achieve a desired average inter-tow pore size given the weave or braid density. For instance, an average inter-tow pore size can range from 50 microns to 1500 microns. Expressed as a percentage of the center-to-center tow spacing, the average inter-tow pore size can be 55% or less of the center-to-center tow spacing of ceramic fabric 16. In other embodiments, the average inter-tow pore size is 35% or less of the average center-to-center tow spacing of the fabric 16.

At step 110, one or more sheets 16 can separated (e.g., cut or split) into plies. In step 112, the plies are arranged into a desired two or three dimensional preform structure. For instance, plies constructed with transformed tows can form an exterior surface of the preform structure. Step 112 can further optionally include deposition of particles onto the preform structure. The volume fraction of particles added to the preform structure can be relatively low (e.g., 1% to 15%). Such particles may be formed from a ceramic material (e.g., silicon carbide, boron carbide, hafnium oxide, hafnium boride, aluminum oxide, ytterbium oxide, or zirconium boride) and are intended to remain as part of the structure through matrix formation and help enhance matrix formation and fortify the resultant CMC. The average particle size suitable for method 100 can be between 20 microns to 100 microns. In some embodiments, the average particle size ranges from 40 microns to 70 microns.

At step 114, the preform structure can undergo matrix formation and densification using a chemical vapor infiltration (CVI), a polymer infiltration and pyrolysis (PIP), or a melt infiltration (MI) process. During CVI or PIP densification, the plies are infiltrated by reactant vapors or a matrix polymer, and a gaseous or polymer precursor deposits on the fibers. The matrix material can be a silicon carbide or other suitable ceramic material. Densification is carried out until the resulting CMC has reached the desired residual porosity. Typically, one or several interphases are deposited prior to the matrix to ensure that the composite fails in a non-brittle manner. Densification using a MI process begins by depositing a matrix polymer on to the fibers in a manner consistent with the PIP process. Subsequently, pores are filed using with molten metal.

During coating and matrix formation of standard (i.e., fabrics formed from as-received or non-transformed tows and/or non-separated) architectures, the diffusion rate of the infiltrant inside of tows (i.e., the intra-tow or inter-filament space) is a fraction of the rate of the infiltrant through the larger pores (i.e., inter-tow space) along the thickness direction of the preform panel. For example, the rate of inter-filament diffusion can be on the order of one-one hundredth the rate of inter-tow diffusion. However, fabrics constructed with flattened tows reduce the inter-tow pore size significantly in comparison to analogous fabric architectures constructed with as-received tows. The transformed tows further increase the intra-tow porosity by separating filaments over a larger tow width that can be further tailored or reduced by splitting or separating tows into subtows. In any of the disclosed, more homogenous architectures, the disparity between the time of diffusion of the infiltrant to the center of a tow, or subtow, from its edge and the time of diffusion of the same infiltrant from the surface of the component to its center is greatly reduced. Furthermore, intra-tow spaces are more accessible to the matrix precursor materials, and the inter-tow spaces (i.e., pores 20) can be more quickly and evenly filled with the precursor materials. Thus, the overall duration of the CVI/PIP/MI process may be greatly reduced, while the matrix precursor material is more evenly distributed within the preform structure.

At step 116, various post-processing steps can be performed, such as the application of one or more protective coatings (e.g., environmental and/or thermal barrier coatings). A bond coat can also be applied to facilitate bonding between the CMC and a protective coating. Other protective coatings, especially those suitable for use in a gas turbine engine environment, are contemplated herein.

DISCUSSION OF POSSIBLE EMBODIMENTS

The following are non-exclusive descriptions of possible embodiments of the present invention.

A method of preparing a ceramic fabric for use in a ceramic matrix composite, among other possible steps, includes transforming a ceramic tow from a first tow geometry to a second tow geometry, thereby reducing a first dimension of the ceramic tow and increasing a second dimension of the ceramic tow orthogonal to the first dimension to produce a flattened ceramic tow. The method further include weaving or braiding the flattened ceramic tow to form the ceramic fabric in which the second dimension of the flattened ceramic tow is oriented parallel to a surface of the ceramic fabric.

The method of the preceding paragraph can optionally include, additionally and/or alternatively, any one or more of the following features, configurations, additional components, and or steps.

A further embodiment of the foregoing method, wherein transforming the ceramic tow can include securing the ceramic tow in tension across at least some of a plurality of rollers, wherein two or more of the plurality of rollers can be arranged to apply opposing pressure to the ceramic tow.

A further embodiment of any of the foregoing methods, wherein transforming the ceramic tow can include passing the ceramic tow through the plurality of rollers, thereby reducing the first dimension of the ceramic tow and increasing the second dimension of the ceramic tow.

A further embodiment of any of the foregoing methods can further include removing a size material from the ceramic tow prior to transforming the ceramic tow.

A further embodiment of any of the foregoing methods can include preparing the flattened ceramic tow before the step of forming the ceramic fabric.

A further embodiment of any of the foregoing methods, wherein preparing the ceramic fabric can further include wetting the flattened ceramic tow with one of water, ethanol, polyvinyl alcohol, and polyvinyl butyral.

A further embodiment of any of the foregoing methods, wherein transforming the ceramic tow can reduce the first dimension of the ceramic tow by at least 15%.

A further embodiment of any of the foregoing methods wherein transforming the ceramic tow can increase the second dimension by at least 15%.

A further embodiment of any of the foregoing methods, wherein transforming the ceramic tow can reduce the first dimension of the ceramic by at least 30%.

A further embodiment of any of the foregoing methods, wherein transforming the ceramic tow can increase the second dimension by at least 30%.

A further embodiment of any of the foregoing methods can include separating the flattened ceramic tow prior to forming the ceramic fabric to form a plurality of flattened ceramic subtows.

A further embodiment of any of the foregoing methods, wherein weaving or braiding the flattened ceramic tow to form the ceramic fabric can include forming the ceramic fabric using the plurality of flattened ceramic subtows.

A further embodiment of any of the foregoing methods, wherein the flattened ceramic subtows have 25% to 50% of the number of filaments as the corresponding flattened ceramic tow.

A further embodiment of any of the foregoing methods can further include separating the ceramic fabric into a plurality of plies.

A further embodiment of any of the foregoing methods wherein an average inter-tow pore size of each ply is 35% or less of an average center-to-center spacing of the flattened ceramic tows.

A further embodiment of any of the foregoing methods can further include laying up the plurality of plies to form a preform structure.

A further embodiment of any of the foregoing methods, wherein the ceramic fabric can have an ends-per-inch or picks-per-inch count from 10 to 16.

A further embodiment of any of the foregoing methods, wherein the ceramic fabric can have 5 to 12 plaits per inch.

A further embodiment of any of the foregoing methods, wherein the average inter-tow pore size of each ply is 10% or less of an average center-to-center spacing of the flattened ceramic tows.

A further embodiment of any of the foregoing methods, wherein the average inter-tow pore size of each ply is at least 50 microns.

A further embodiment of any of the foregoing methods can further include laying up the plurality of plies to form a preform structure.

A further embodiment of any of the foregoing methods can further include densifying the preform structure using a chemical vapor infiltration process, a polymer infiltration and pyrolysis process, or a melt infiltration process.

A further embodiment of any of the foregoing methods, wherein the ceramic tow can be silicon carbide.

A further embodiment of any of the foregoing methods, wherein the densifying matrix particles can be silicon carbide, boron carbide, hafnium oxide, hafnium boride, aluminum oxide, ytterbium oxide, and zirconium boride.

A further embodiment of any of the foregoing methods, wherein the densifying matrix particles can have an average particle size ranging from 20 microns to 100 microns.

A further embodiment of any of the foregoing methods, wherein the densifying matrix particles can have an average particle size range between 40 microns and 70 microns.

A further embodiment of any of the foregoing methods can further include laying up at least one ply of the plurality of plies to form a preform structure.

A further embodiment of any of the foregoing methods, wherein the at least one ply can be an exterior ply of the preform structure.

A further embodiment of any of the foregoing methods, wherein the exterior ply forms an exterior surface of an airfoil, blade outer air seal, or strut of a gas turbine engine.

A further embodiment of any of the foregoing methods, wherein a surface roughness of the at least one ply is less than a corresponding ply formed by the ceramic tow.

A further embodiment of any of the foregoing methods, wherein transforming the ceramic tow thereby decreases the inter-tow pore size.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of preparing a ceramic fabric for use in a ceramic matrix composite, the method comprising:
    transforming a ceramic tow from a first tow geometry to a second tow geometry, thereby reducing a first dimension of the ceramic tow and increasing a second dimension of the ceramic tow orthogonal to the first dimension to produce a flattened ceramic tow;
    weaving or braiding the flattened ceramic tow to form the ceramic fabric, wherein the second dimension of the flattened ceramic tow is oriented parallel to a surface of the ceramic fabric; and
    removing a size material from the ceramic tow prior to transforming the ceramic tow.

2. The method of claim 1, wherein transforming the ceramic tow includes:
    securing the ceramic tow in tension across at least some of a plurality of rollers, wherein two or more of the plurality of rollers are arranged to apply opposing pressure to the ceramic tow; and
    passing the ceramic tow through the plurality of rollers, thereby reducing the first dimension of the ceramic tow and increasing the second dimension of the ceramic tow.

3. The method of claim 1, further comprising:
    preparing the flattened ceramic tow before the step of forming the ceramic fabric, wherein preparing the flattened ceramic tow comprises wetting the flattened ceramic tow with one of water, ethanol, polyvinyl alcohol, and polyvinyl butyral.

4. The method of claim 1, wherein transforming the ceramic tow reduces the first dimension of the ceramic tow by at least 15% and increases the second dimension by at least 15%.

5. The method of claim 4, wherein transforming the ceramic tow reduces the first dimension of the ceramic tow by at least 30% and increases the second dimension by at least 30%.

6. The method of claim 1, further comprising:
    separating the flattened ceramic tow prior to forming the ceramic fabric to form a plurality of flattened ceramic subtows; and
    wherein weaving or braiding the flattened ceramic tow to form the ceramic fabric comprises forming the ceramic fabric using the plurality of flattened ceramic subtows.

7. The method of claim 6, wherein the flattened ceramic subtows have 25% to 50% the number of filaments as the corresponding flattened ceramic tow.

8. The method of claim 6, further comprising:
    separating the ceramic fabric into a plurality of plies, wherein an average inter-tow pore size of each ply is 35% or less of an average center-to-center spacing of the flattened ceramic tows; and
    laying up the plurality of plies to form a preform structure.

9. The method of claim 1, wherein the flattened ceramic tows are woven to form the ceramic fabric, and wherein the ceramic fabric has an ends-per-inch or picks-per-inch count from 10 to 16.

10. The method of claim 1, wherein the flattened ceramic tows are braided to from the ceramic fabric, and wherein the ceramic fabric has 5 to 12 plaits per inch.

* * * * *